April 14, 1964  J. MAREZ  3,129,420
FIVE LEVEL WAVEFORM SYNTHESIZER
Filed Oct. 25, 1962

INVENTOR.
JOHN (NMI) MAREZ
BY
ATTORNEYS

April 14, 1964  J. MAREZ  3,129,420
FIVE LEVEL WAVEFORM SYNTHESIZER
Filed Oct. 25, 1962  3 Sheets-Sheet 2

INVENTOR.
JOHN (NMI) MAREZ
BY
ATTORNEYS

United States Patent Office 3,129,420
Patented Apr. 14, 1964

3,129,420
FIVE LEVEL WAVEFORM SYNTHESIZER
John Marez, 3407 Lockwood Drive, San Diego 23, Calif.
Filed Oct. 25, 1962, Ser. No. 233,164
4 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

The present invention relates to a modification and improvement of the digital to analogue waveform synthesizer disclosed in co-pending application Serial No. 131,688; Digital-to-Analogue Waveform Synthesizer; and specifically to a five level digital-to-analogue waveform synthesizer as used in a symbol generator.

The prior art as described in the aforesaid co-pending application and the disadvantages and shortcomings thereof are set forth with particularity.

The major difference between the digital-to-analogue waveform synthesizer set forth in the co-pending application Serial No. 131,688 and the present five level matrix is that different circuitry is used to obtain the extra flexibility attributed to the five level method. The advantages that flow from the use of the five level circuitry comprise simplicity and ease of implementation due to one basic circuit which is used to make the entire synthesizer. Through the use of the five level method five degrees of freedom per axis are acquired as well as reliability due to simplicity of circuitry. In addition, high speeds of operation are encompassed i.e., up to one megacycle clock-rates or higher.

An object of the present invention is to provide a digital-to-analogue waveform synthesizer which is extremely simple to implement and reliable in operation.

Another object of the present invention is to provide a system for converting digital information to analogue voltages which have five degrees of freedom per axis and has high reliability in operation.

An additional object of the present invention is to provide a system for converting digital information to analogue voltages at extremely high speeds with extremely reliable operation.

A further object of the present invention is to provide a waveform synthesizer which converts precoded digital data to linear increments of two positive voltages, a zero voltage, two minus voltages, maintains a linear transition while changing from one voltage level to an adjacent voltage level, all at high speeds.

Various other objects and advantages will appear from the following description of one embodiment of the invention, and the novel features will be particularly pointed out hereinafter in connection with the appended claims.

In order to better understand the invention an embodiment thereof will be described and explained in connection with the accompanying drawings wherein.

Figure 1:
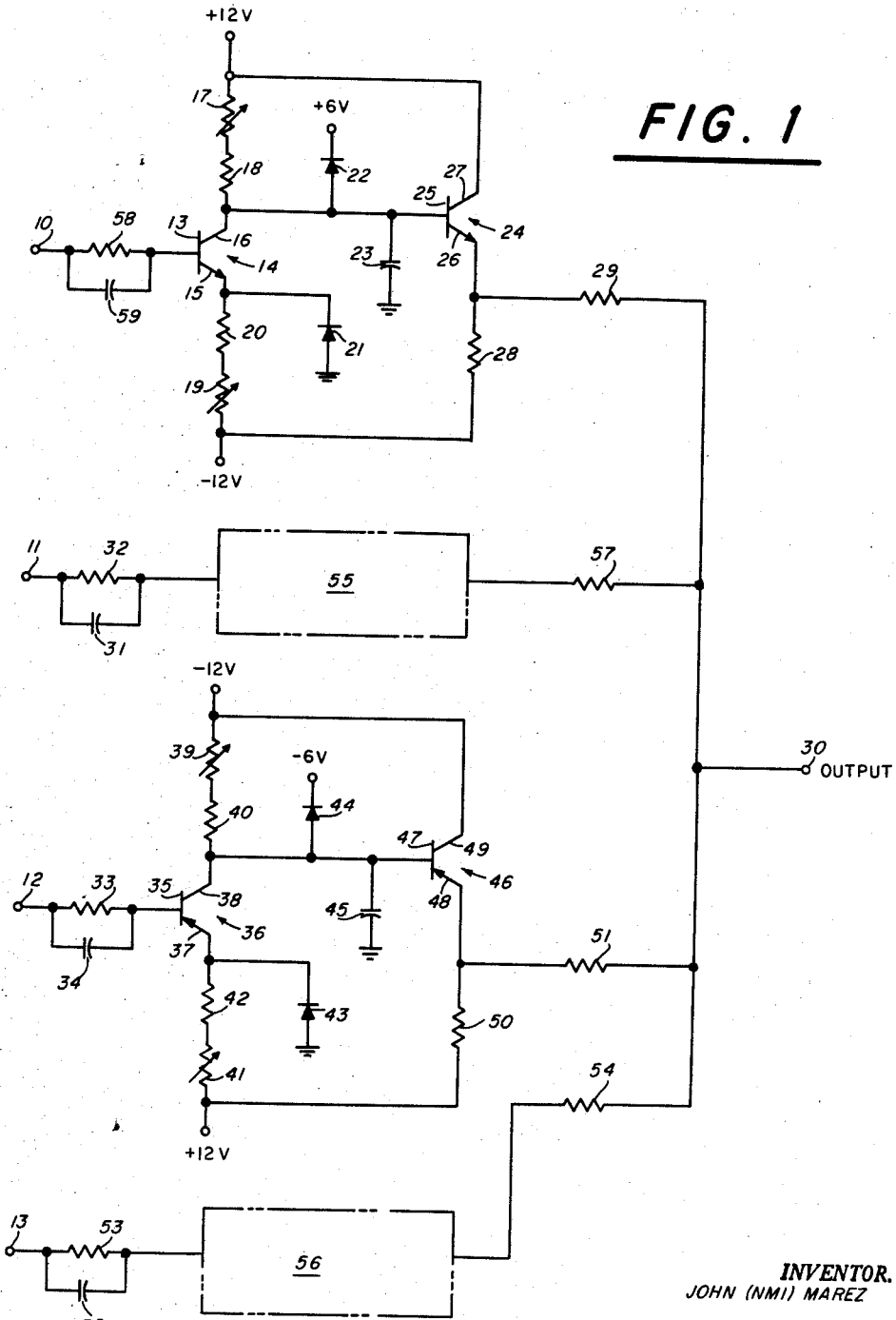
FIG. 1 is a schematic diagram of a digital-to-analogue waveform synthesizer.

The embodiment of FIG. 1 illustrates the circuitry used for generating, for instance, the X coordinate voltages. It is to be understood exactly the same circuitry would be used for generating the Y coordinate voltages, in that the same circuitry is used for X and Y voltages only and an explanation relative to the X circuitry will be set forth.

In FIG. 1 digital data is coupled to the inputs 10, 11, 12, and 13. As can be seen from FIG. 1 four circuits are utilized to generate the X output voltages which are then coupled to the X input on a cathode ray tube for generating the X portion of a symbol. The positive portions of the X voltage are generated by two circuits which are exactly alike and the negative going portions of the X output voltage are generated by two circuits which are exactly alike and which have voltages applied thereto which are of opposite polarity with respect to the positive circuitry. It is to be understood that the circuitry which generates the positive and negative portions of the voltage are essentially the same except for the transistors used and the bias voltages applied thereto.

With respect to the positive and negative circuitry only one of each of the respective circuits will be explained in detail. Digital data coupled to the input 10 is connected to one side of an RC network comprising resistor 58 and capacitor 59 connected in parallel. The other side of the RC network is connected to a base element 13 of an NPN transistor 14 having an emitter element 15 and collector element 16. Reverse bias is applied to the collector element 16 from a +12 volt bias supply through a potentiometer 17 and current limiting resistor 18 connected in series between the 12 volt supply and collector 16. Forward bias is applied from a −12 volt supply to the emitter element 15 through potentiometer 19 and current limiting resistor 20 connected in series between the bias supply and the emitter. Also connected to the emitter 15 is the cathode element of a clamping diode 21 which has its anode connected to ground.

Connected to collector 16 is the anode element of another clamping diode 22 which has its cathode connected to a +6 volt supply. Also connected to the collector 16 is one side of an integrating capacitor 23 which has its other side connected to ground.

A buffer circuit comprising an emitter follower which in turn comprises an NPN transistor 24 having a base element 25, emitter element 26 and collector element 27 is also provided. Base element 25 is connected to the collector 16 of transistor 14; the collector element 27 is connected to the +12 volt supply and the emitter 26 is connected to the −12 volt supply through a current limiting resistor 28. Also connected to the emitter 26 is one side of a summing resistor 29 the other side of which is connected in turn to an output terminal 30.

The other positive going waveform generator is the same as the circuit just described and in this portion digital logic is coupled to input 11 and then through an RC network comprising capacitor 31 and resistor 32 to the switching and buffer circuitry contained in block 55. The output of the switching circuitry is connected to one side of another summing resistor 57 the other side of which is connected to the output 30.

In the first portion of the negative going circuitry digital data is connected to input 12 and then to one side of an RC network consisting of resistor 33 and capacitor 34 connected in parallel. The other side of the RC network is connected to a base element 35 of a PNP transistor 36 also having an emitter element 37 and collector element 38. Reverse bias is applied to the collector element 38 from a −12 voltage supply through a potentiometer 39 and current limiting resistor 40 connected in series between the reverse bias supply and the collector element. Forward bias is applied to the emitter 37 from a +12 volt supply through a potentiometer 41 and current limiting resistor 42 connected in series between the positive bias supply and the emitter. Also connected to emitter 37 is the anode of a clamping diode 43 which has its cathode connected to ground.

Connected to the collector 38 is the cathode element of another clamping diode 44 which has its anode connected to a −6 volt supply. One side of an integrating capacitor 45 is also connected to the collector 38 and the other side of the integrating capacitor is connected to ground.

A buffer circuit comprising a PNP transistor 46 is provided which has a base element 47, emitter element 48 and collector 49. The base 47 is connected directly to the collector 38 of transistor 36 while the collector element 49 is connected to the −12 volt supply. The emitter element 48 is connected to the +12 volt supply through a current limiting resistor 50 and the emitter 48 is also connected to the output terminal 30 through a summing resistor 51.

The circuitry of the second section of the minus voltage generating block is the same as the circuit just described and in this instance the digital information is coupled to input 13 and then through an RC network comprising capacitor 52 and resistor 53 connected in parallel to the switching and buffer circuitry contained in block 56. The output from the block 56 is coupled to output 30 through a summing resistor 54.

Figure 2:
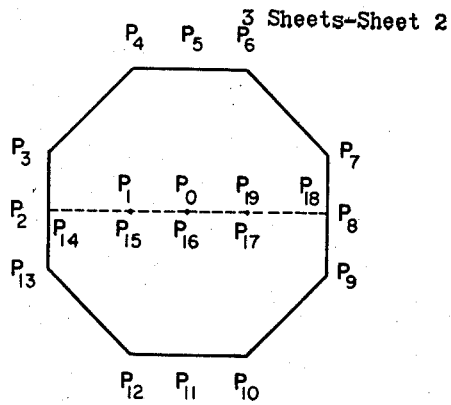
FIG. 2 is a schematic representation of an approximate circle generated by the system of the present invention.

FIG. 2 illustrates an approximate circle which could be generated with the present five level matrix. Starting out at position $P_0$ the trace on a CRT would move chronologically from $P_0$, to $P_1$, to $P_2$ to $P_3$ etc. until the final position at $P_0$ were again reached.

Figure 3:
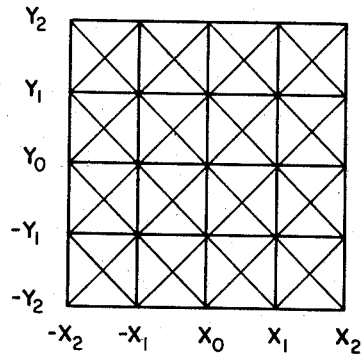
FIG. 3 is an X and Y coordinate system showing the various directions in which the trace on a CRT may be caused to move.

FIG. 3 merely illustrates the various single strokes which may be executed by a trace on a CRT. It is to be understood that if two voltages i.e. a voltage from the X and Y generators are combined and applied to the X and Y circuitry of the CRT a diagonal stroke may be obtained wherever desired.

Figure 4:
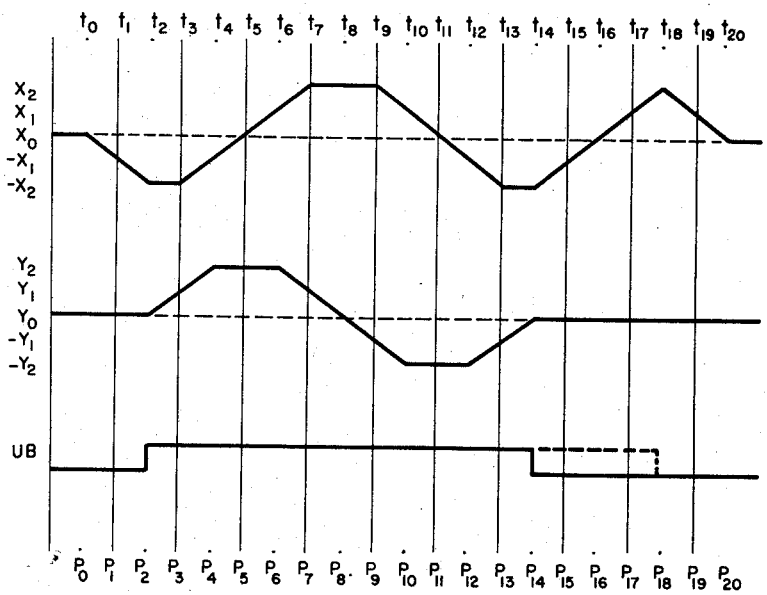
FIG. 4 represents the X—Y output voltages for the circle, which corresponds to the X and Y inputs to a cathode ray tube, and the unblank voltage coupled thereto.

FIG. 4 illustrates the X and Y voltages which might be applied to the CRT and the unblank voltage which would be coordinated with X and Y voltages to produce the approximate circle of FIG. 2. As can be seen, the chronology i.e. $P_0$ back to $P_0$ which appear on FIG. 2 are laid out on the X and Y voltage waveforms. In addition the time function is also provided above the X waveform i.e. $t_0$ through $t_{20}$.

Figure 5:
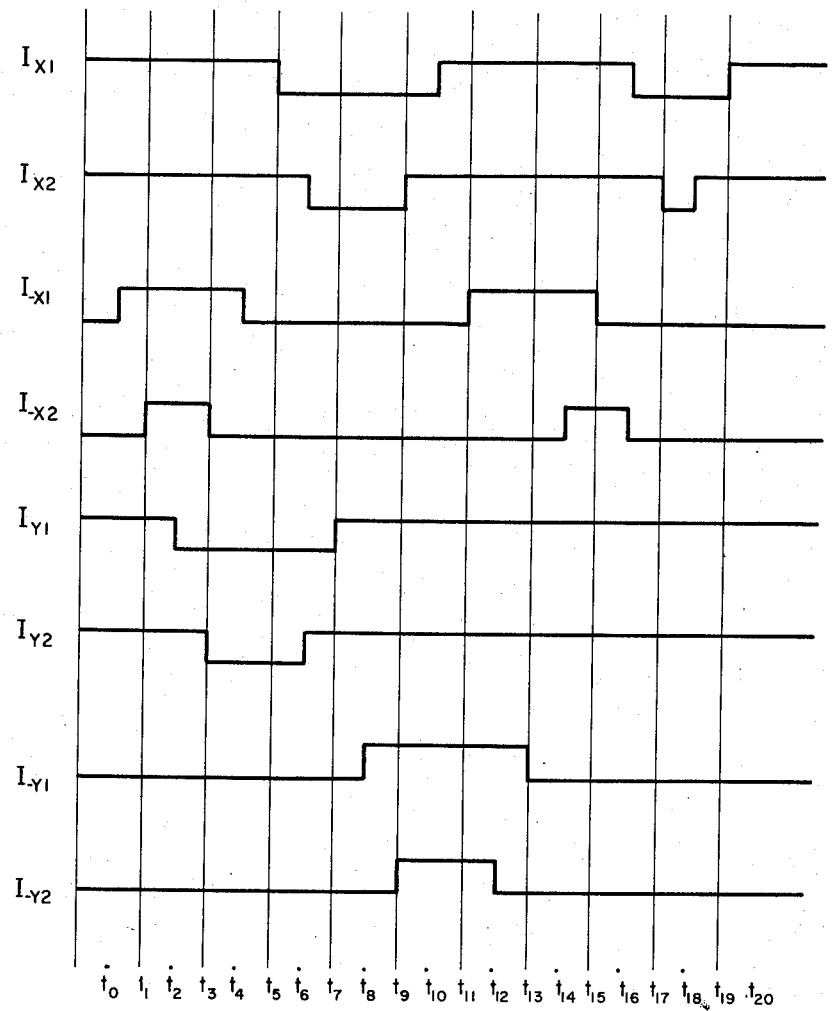
FIG. 5 shows the X and Y voltages, corresponding to the digital logic, coupled to the various inputs of the waveform generators.

FIG. 5 illustrates the various voltages that would be coupled to the inputs corresponding to input terminals 10 through 13 in order to produce the approximate circle of FIG. 2.

*Operation*

In the operation of the persent system, at a time prior to all of the various switching blocks are turned on i.e. a positive voltage would be applied to the input terminals 10, 11 and a negative voltage to the input terminals 12, 13. At this point the NPN transistor 14, for example, is turned on the clamping diode 21 clamps the emitter element 15 at ground potential. Therefore, the base element 25 of transistor 24 is at ground potential and in that transistor 24 is connected as an emitter follower the emitter element 26 is also clamped at ground potential. The output at ouput terminal 30 is ground potential or 0 volts when the output of all emitter buffer elements are at ground potential. The same holds true for the circuitry contained within block 55 corresponding to the other portion of the positive waveform generator. Thus, a positive voltage is also coupled into input terminal 11 and 0 volts appears across the summing resistor 57 and therefore 0 volts will appear at output 30.

In order to turn transistor 36 on a negative voltage is applied to input 12 and the emitter 37 is clamped at ground potential through clamping diode 43. The base element 47 is then also clamped at ground potential and due to the fact that the transistor 46 is connected as an emitter follower the emitter 48 is also at ground potential. Therefore, there will be no output at output 30. The same holds true for the circuitry contained within block 56 in that a negative voltage is applied to input 11 which turns the transistor contained within the block on which again given 0 volts at output 30.

Should it be desired that a voltage appear at output 30, for instance corresponding to one positive level, a negative bias is coupled to input 10 which would turn transistor 14 off. As transistor 14 is turned off capacitor 23 will attempt to charge to 12 volts through potentiometer 17 and current limiting resistor 18. The shape of the waveform while charging the capacitor will be determined by the setting of potentiometer 17 and the sharpness of the curve may be adjusted within limits. Before capacitor 23 is charged to +12 volts the clamping diode 22 takes over and clamps the voltage at +6 volts. This is done to insure that the proper portion of the charging curve is used i.e., essentially a straight line function. Through the use of emitter follower 24 the positive 6 volts at the integrating capacitor 23 applied at the base 25 also appears at emitter 26. The 6 volts is reduced to approximately 1.5 volts through summing resistor 29 and appears as a positive 1.5 volts at output 30.

Should a second level of positive voltage be used a negative input would also be coupled to input 11 which would in turn cut off the transistor contained within block 55 which would approximately double the output voltage at 30.

When transistor 14 is turned on again the capacitor 23 discharges through collector 16, emitter 15, current limiting resistor 20 and potentiometer 19. Potentiometer 19 is utilized to attain a discharge curve which is essentially a straight line. As soon as the capacitor discharges to ground potential the clamping diode 21 comes into play and clamps the emitter 21 at ground potential. At this point, through the use of emitter follower 24, 0 volts will appear at the output 30, assuming no other sections are producing outputs. The same would apply with respect to the circuitry in block 55.

In the operation of the negative portion of the waveform synthesizer in order to turn transistor 36 off a positive voltage is applied to input 12. When transistor 36 is turned off integrating capacitor 45 begins to charge to a −12 volts and the charging rate is again determined by a potentiometer 39. Before the integrating capacitor can reach the full −12 volts clamping diode 44 comes into play and clamps the voltage at a −6 volts. Through the use of emitter follower 46 the −6 volts applied at the base element 47 appears at the emitter element 48 and is summed by summing resistor 51 and appears as a −1.5 volts at output 30.

Should a second level of negative voltage be desired a positive voltage would be applied to input 13 which would cut off the transistor contained within block 56 which would give a second level of negative output voltage at output 30.

When transistor 36 is turned on again integrating capacitor 45 discharges through collector 38, emitter 37, current limiting resistor 42 and potentiometer 41. As in the positive section, potentiometer 41 is utilized to regulate the discharge curve of integrating capacitor 45 so that it is essentially a straight line function in the first portion of the discharge curve. When capacitor 45 has discharged to ground potential the emitter 37 is clamped at ground potential by clamping diode 43.

Through the use of emitter follower 46 the ground potential appearing at emitter 37 will appear at the base 47 of transistor 46. Emitter 98 will also be at ground and thus zero volts will appear, again assuming no other sections are producing an output at the output 30, the same would apply to the operation of the circuiting in block 56.

It is to be understood that the positive sections and negative sections are mutually exclusive i.e. only one level or two levels of either a positive or negative voltage can be generated at one time. That is to say, one cannot generate both negative and positive voltages at the same time in that one would cancel the other. However, one might generate a negative voltage in the X section and a positive voltage in the Y section simultaneously.

The use of the digital logic and voltage waveforms in FIGS. 5 and 4 to generate the approximate circle of FIG. 2 is not gone into in detail in that it is believed the voltage waveforms and the accompanying digital inputs are self-explanatory.

The buffer circuitry is used for isolation in that the drive the following stages would destroy the waveforms appearing at the various integrating capacitors. The input RC circuit, comprising, for example, resistor 11 and capacitor 12 might be modified to use only resistor 11 if so desired and if the on-off time were not required to be at a high rate.

It will be understood that various changes in the details, materials and arrangements of parts, which have herein been described and illustrated in order to explain the nature of the invention, may be made by those skilled in the art within the principle and scope of the invention as expressed in the appended claims.

What is claimed is:

1. A five level digital-to-analogue waveform synthesizer comprising:
   (a) four waveform generating sections;
   (b) each waveform generating section comprising, input means for receiving digital information;
   (c) a source of voltage;
   (d) switching means operatively connected to said input means and said voltage source for turning on and off said voltage source in response to digital information coupled to said switching means;
   (e) integrating means connected to the output of said switching means for integrating the output from said switching means, thereby generating a substantially linear waveform when said switch is turned off and on in response to said digital information;
   (f) buffer means operatively coupled to the output of said integrating means for isolating the output of said integrating means and providing a higher level of output drive to a succeeding stage;
   (g) and summing means operatively connected to the output of said buffer means for summing the output voltage from said means.

2. A five level digital-to-analogue waveform synthesizer for generating a waveform having two positive going portions with respect to a zero reference axis and two negative going portions with respect to a zero reference axis comprising;
   (a) four waveform generating circuits, each waveform generating circuit comprising,
   (b) input means for receiving digital information;
   (c) a source of supply voltage;
   (d) switching means operatively coupled to said input means and said source of supply voltage for turning on and off said supply voltage in response to digital information coupled from said input means;
   (e) integrating means connected to the output of said switching means for integrating the output from said switching means, thereby generating a substantially linear waveform when said switch is turned off and on;
   (f) buffer means operatively coupled to the output of said integrating means for isolating said integrating means from further stages and for increasing the output drive from said integrating means;
   (g) and summing means operatively connected to the output of said buffer means for summing the output voltage from said buffer means.

3. A five level digital-to-analogue waveform synthesizer for generating a waveform having two positive portions with respect to a zero reference axis and two negative portions with respect to a zero reference axis comprising;
   (a) four waveform generating circuits corresponding to positive going waveform generating means and negative going waveform generating means, each waveform generating circuit including,
   (b) input means for receiving digital information;
   (c) a source of supply voltage; switching means operatively coupled to said input means and said source of supply voltage for turning on and off said supply voltage in response to digital information coupled from said input means;
   (d) integrating means connected to the output of said switching means for integrating the output from said switching means thereby generating a substantially linear waveform when said switch is turned off and on in response to digital information coupled thereto;
   (e) buffer means operatively coupled to said integrating means for isolating said integrating means from further stages and for increasing the output drive from said integrating means;
   (f) and summing means operatively coupled to said waveform generating circuits for mixing the outputs from said positive going waveform generating means and said negative going waveform generating means thereby producing an output waveform which represents the algebraic sum of said negative going and positive going waveforms.

4. A five level digital-to-analogue waveform synthesizer as set forth in claim 3 and further including; voltage level clamping means operatively coupled to said integrating means for clamping the output from said integrating means at a predetermined value of voltage.

References Cited in the file of this patent
UNITED STATES PATENTS
3,989,741     Gordon _____ June 20, 1961